United States Patent
Kuhn et al.

(10) Patent No.: US 11,623,191 B2
(45) Date of Patent: Apr. 11, 2023

(54) SYSTEM FOR APPLYING A BUILDING MATERIAL WITH MULTIPLE MIXERS AND MOVEMENT DEVICE

(71) Applicant: SIKA TECHNOLOGY AG, Baar (CH)

(72) Inventors: Patrik Kuhn, Zürich (CH); Raphael Bourquin, Neerach (CH); Armin Brühwiler, Bütschwil (CH); Didier Lootens, Küssnacht (CH)

(73) Assignee: SIKA TECHNOLOGY AG, Baar (CH)

( * ) Notice: Subject to any disclaimer, the term of this patent is extended or adjusted under 35 U.S.C. 154(b) by 367 days.

(21) Appl. No.: 16/633,248

(22) PCT Filed: Aug. 9, 2018

(86) PCT No.: PCT/EP2018/071637
§ 371 (c)(1),
(2) Date: Jan. 23, 2020

(87) PCT Pub. No.: WO2019/030328
PCT Pub. Date: Feb. 14, 2019

(65) Prior Publication Data
US 2020/0171451 A1 Jun. 4, 2020

(30) Foreign Application Priority Data
Aug. 9, 2017 (EP) .................................. 17185653

(51) Int. Cl.
*B01F 33/501* (2022.01)
*B33Y 10/00* (2015.01)
*B33Y 70/00* (2020.01)
*B28B 1/00* (2006.01)
(Continued)

(52) U.S. Cl.
CPC ...... *B01F 33/5013* (2022.01); *B01F 27/1121* (2022.01); *B01F 27/1921* (2022.01);
(Continued)

(58) Field of Classification Search
CPC .............. B01F 33/5013; B01F 27/1121; B01F 27/1921; B01F 27/213; B01F 35/561;
(Continued)

(56) References Cited

U.S. PATENT DOCUMENTS

2016/0107396 A1   4/2016   Berman

FOREIGN PATENT DOCUMENTS

CN           201525083 U      7/2010
CN           204354263 U      5/2015
(Continued)

OTHER PUBLICATIONS

Oct. 11, 2018 Search Report issued in International Patent Application No. PCT/EP2018/071637.
(Continued)

*Primary Examiner* — Joseph S Del Sole
*Assistant Examiner* — Guy F Mongelli
(74) *Attorney, Agent, or Firm* — Oliff PLC

(57) ABSTRACT

A system for applying a building material, including: a first component of the building material, including a first constituent and a second constituent; a second component of the building material; a first mixer for mixing the first constituent and the second constituent; a supply device for supplying the first constituent to the mixer; a movement device for modifying a site of application in a space; and a second mixer for mixing the first component and the second component.

12 Claims, 3 Drawing Sheets

(51) Int. Cl.
*B28C 5/12* (2006.01)
*B28C 5/14* (2006.01)
*E04B 1/16* (2006.01)
*B01F 27/213* (2022.01)
*B01F 27/1121* (2022.01)
*B01F 27/192* (2022.01)
*B01F 35/00* (2022.01)
*B33Y 30/00* (2015.01)
*B01F 101/28* (2022.01)

(52) U.S. Cl.
CPC .......... *B01F 27/213* (2022.01); *B01F 35/561* (2022.01); *B28B 1/001* (2013.01); *B28C 5/1253* (2013.01); *B28C 5/148* (2013.01); *B33Y 10/00* (2014.12); *B33Y 30/00* (2014.12); *B33Y 70/00* (2014.12); *E04B 1/16* (2013.01); *B01F 2101/28* (2022.01)

(58) Field of Classification Search
CPC .............. B01F 2101/28; B01F 27/0724; B01F 27/2123; B28B 1/001; B28C 5/1253; B28C 5/148; B28C 5/0875; B28C 7/0422; B28C 7/0454; B33Y 10/00; B33Y 30/00; B33Y 70/00; E04B 1/16
See application file for complete search history.

(56) References Cited

FOREIGN PATENT DOCUMENTS

| | | |
|---|---|---|
| CN | 206317240 U | 7/2017 |
| EP | 1 529 617 A2 | 5/2005 |
| EP | 1529617 A2 * | 5/2005 ............. B28C 7/161 |
| JP | S5881117 A | 5/1983 |
| JP | S61149314 A | 7/1986 |
| JP | H03-186334 A | 8/1991 |
| JP | H05116130 A | 5/1993 |
| JP | 2005-170723 A | 6/2005 |
| JP | 4214217 B2 * | 1/2009 |
| JP | 3201809 U | 12/2015 |
| KR | 1020150138608 A | 12/2015 |
| KR | 1020160068564 A | 6/2016 |
| WO | 2013/064826 A1 | 5/2013 |

OTHER PUBLICATIONS

Feb. 11, 2020 International Preliminary Report on Patentability issued in International Patent Application No. PCT/EP2018/071637.

* cited by examiner

SYSTEM FOR APPLYING A BUILDING MATERIAL WITH MULTIPLE MIXERS AND MOVEMENT DEVICE

The present invention relates to a system for applying a building material, and to a method for producing a structure from building material.

Various systems have already been proposed for the automated application of building materials. For example, WO 2013/064826 A1 discloses a method and a device for applying cementitious materials. Liquid cementitious material is applied here to an intended destination via a movable robot arm. A disadvantage of such systems is that the building material is frequently insufficiently constant in respect of various properties, in particular in respect of thorough mixing of components. As a result, a structure produced with the building material may have irregularities.

It is therefore an object of the present invention to provide a system for applying a building material and a method for producing a structure from a building material, wherein the building material is as constant as possible in respect of its properties regarding the application. In particular, a high-quality structure is intended to thereby be constructed reproducibly and continuously with the building material.

This object is first of all achieved by a system for applying a building material, wherein the system comprises: a first component of the building material, the first component comprising a first ingredient and a second ingredient; a second component of the building material; a first mixer for mixing the first ingredient and the second ingredient of the first component; a supply device for supplying the first ingredient of the first component to the first mixer; a movement device for changing a site of application in a space; and a second mixer for mixing the first component and the second component.

The solution proposed here first of all has the advantage that a more constant property of the building material as the latter exits from the system can be achieved by the use of a first mixer and a second mixer. The system proposed here envisages in particular ingredients of the first component being mixed with the first mixer before the first component is mixed with the second component with a second mixer. Such a two-stage mixing process permits overall more thorough mixing of all of the ingredients and components of the building material.

The system proposed here furthermore affords the advantage that an operation to apply the building material can be better automated by the provision of two mixers. In contrast to systems with only one mixer, the system proposed here can be supplied with individual ingredients and components which are each per se stable on storage and can therefore be supplied to the system in a simple and automated manner.

A further advantage of the system proposed here consists in that more energy can be admitted into the building material by the provision of two mixers. This firstly leads to more thorough mixing, to fewer air pockets in the building material and, furthermore, water consumption for the building material can thereby be reduced. In addition, the increased admission of energy makes it possible for fewer additives to be used, which leads to a more cost-effective solution. Overall, all of these properties of the system proposed here contribute to better properties of the building material for the automated application of the building material, for example in order to build structures from building material.

In an exemplary embodiment, the building material comprises concrete or mortar. The first ingredient of the first component of the building material comprises cement and an aggregate, and the second ingredient of the first component of the building material comprises water.

This has the advantage that a homogeneous pumpable concrete or mortar can be produced with the first mixer by the cement and the aggregate being mixed with water.

In particular, as a result, a pumpable concrete or mortar can be produced as the first component of the building material which contains comparatively less water and fewer air pockets and can thus be supplied to the second mixer.

In an exemplary development, the first ingredient of the first component of the building material is a dry mixture, in particular a mixture comprising cement and an aggregate.

In an exemplary development, the second ingredient of the first component of the building material comprises additives which are added to the water.

Examples of additives which can be used are a concrete admixture and/or a mortar admixture and/or process chemicals.

The at least one additive comprises in particular a defoamer, a wetting agent, a dye, a preservative, a flow agent, a retarder, further accelerators, a polymer, an air pore former, a rheological aid, a viscosity modifier, a pumping aid, a shrinkage reducer or a corrosion inhibitor, or combinations thereof.

In an exemplary embodiment, the second component of the building material comprises a hardening accelerator.

This affords the advantage that the hardening accelerator can thereby be mixed in the second mixer with the first component which has already been mixed. By mixing the hardening accelerator with a first component which has already been thoroughly mixed, better properties of the building material can be obtained when the latter leaves the system. Since the first component of the building material has already been solubilized by the first mixer, the hardening accelerator added in the second mixer can have a better effect on the first component of the building material. Less hardening accelerator can thereby be used, which leads to a reduction in costs, and which also leads to a reduced admission of water by the hardening accelerator, and therefore hardening in turn takes place more rapidly.

In an alternative embodiment, the building material is a multi-component composition based on plastic. In this case, the first component typically comprises a reactive polymer or monomer and the second component comprises a hardener or accelerator for crosslinking or hardening said polymer or monomer. Examples of such compositions include epoxy resins, polyurethanes, silane-functional polymonomers, silicones, acrylates and the like.

In an exemplary embodiment, the first mixer and/or the second mixer are/is constructed modularly, wherein the mixer here comprises a drive module with a first coupling element and a mixing chamber module with a second coupling element, wherein the modules are operatively connected in a use state via the coupling elements.

The provision of a modularly constructed mixer affords the advantage that only those parts of the mixer which come into contact with the building material can be exchanged and/or maintained and/or cleaned. Therefore, only lighter parts of the mixer have to be removed in order to carry out maintenance work on the system. In addition, for example, the mixing chamber module as a whole can be exchanged, in particular for use with a different building material.

In an exemplary development, the first coupling element and the second coupling element each comprise a toothing, and therefore, in a use state, the drive module and the mixing chamber module are operatively connected mechanically to each other.

In an exemplary embodiment, the first mixer is arranged in a stationary manner.

The provision of a stationary first mixer affords the advantage that the first component in the first mixer can thereby be produced in a cost-efficient and automated manner, for example by corresponding means for supplying the ingredients of the first component.

In an exemplary embodiment, the second mixer is arranged on the movement device, wherein the second mixer is movable by the movement device.

The provision of a second mixer arranged movably on the movement device has the advantage that the second mixer can thereby be arranged in a region of the site of application, as a result of which the first component and the second component can be mixed shortly before the building material leaves the system. As a result, for example, hardening accelerator can be mixed with pumpable concrete or mortar in the second mixer, and the risk of blocking of the system by hardened concrete or mortar in the system is reduced by an arrangement proposed here of the second mixer.

In an exemplary embodiment, the first mixer and/or the second mixer comprise/comprises a stirring shaft which is equipped with stirring elements on a first portion and on which a conveying element is arranged on a second portion.

It has been shown that, firstly, the first component of the building material can thereby be conveyed out of the first mixer, and that in particular the building material can be mixed and conveyed in an advantageous manner with such an arrangement in the second mixer.

In an advantageous development, the stirring elements are designed as pins.

In a further advantageous embodiment, the stirring elements have an external thread, and therefore the stirring elements can be screwed into depressions with internal threads on the stirring shaft.

In an exemplary development, the conveying element is designed as a screw conveyor.

In an exemplary development, the first portion of the stirring shaft is arranged in a first region of a drum of the mixer, in which region the drum has at least one inlet. In addition, the second portion of the stirring shaft is arranged in a second region of the drum, in which region the drum has an outlet.

In an exemplary development, the conveying element can be pulled off from the stirring shaft in the direction of an axis of the stirring shaft.

In an exemplary development, the conveying element comprises a fastening element for locking the conveying element on the stirring shaft.

In an exemplary development, a drum of the mixer is formed integrally and/or in tubular form.

In an exemplary embodiment, the supply device comprises a storage device and a metering device.

The provision of a separate storage device and metering device has the advantage that the building material can thereby be applied continuously with the system.

In an exemplary development, the metering device is designed as a gravimetric metering device.

The provision of a gravimetric metering device affords the advantage that the first ingredient of the first component, in particular a dry mixture composed of cement and aggregate, can be supplied in precise quantities to the system. The quality of the building material can thereby be kept constant.

In an exemplary development, the storage device comprises a hopper and a conveyor. The conveyor can be designed in particular as a screw conveyor or conveyor belt.

The provision of a hopper and a conveyor has the advantage that large units of the first ingredient of the first component of the building material, such as, for example, large containers or sacks (called big bags in technical language), are thereby used in the storage device. For example, such large units of the first ingredient of the first component can be suspended in the storage device and supplied to a conveyor via a hopper. The hopper here has the advantage that it can be used as a store and can thus bridge a period of time for exchange of the container of the first ingredient of the first component of the building material. The conveyor can supply, for example, the first component to the metering device.

In an exemplary embodiment, the system comprises a first pump and/or a second pump, wherein the first component can be pumped by the first mixer to the second mixer by the first pump, and wherein the second component can be pumped to the second mixer by the second pump.

The provision of such a first pump and/or second pump for supplying the first component and/or the second component to the second mixer affords the advantage that the first component and the second component can thereby be supplied continuously and with a constant flow to the second mixer.

In an exemplary embodiment, the movement device has a movable head, wherein the second mixer is arranged on the movable head such that the second mixer is in a region of the site of application.

The arrangement of the second mixer on a head of the movement device has the advantage that the first and the second component are thereby mixed with each other immediately before the building material emerges from the system. As a result, the pumpable concrete or mortar can be mixed with the hardening accelerator in such a manner that the building material hardens shortly after it emerges from the system, as a result of which structures can be efficiently produced from the building material. In particular, structures can thereby be produced with the building material in the manner of a 3D printer.

In an exemplary embodiment, the movement device can be designed in the manner of a crane. In an exemplary development, the movement device has a movable arm.

In an alternative development, the movement device comprises a plurality of assemblies which are arranged displaceably on rails.

The object set at the beginning is furthermore achieved by a method for producing a structure from a building material, wherein the method comprises: providing a first ingredient of a first component of the building material; providing a second ingredient of the first component of the building material; mixing the first ingredient and the second ingredient of the first component in a first mixer; providing a second component of the building material; mixing the first component and the second component in a second mixer; moving a movement device for changing a site of application in a space; and applying the building material.

The method proposed here for producing a structure from a building material affords the same advantages as have already been described above for the system.

In an exemplary embodiment, the first mixer and/or the second mixer are/is operated at a rotational speed of more than 500 revolutions per minute, preferably at a rotational speed of more than 650 revolutions per minute, particularly preferably at a rotational speed of more than 800 revolutions per minute, particularly preferably at a rotational speed of more than 1000 revolutions per minute.

The operation of the first mixer and/or of the second mixer at high rotational speeds affords the advantage that mixing materials having a high or rapidly increasing viscosity (such as, for example, pumpable concrete or mortar or concrete or mortar with a hardening accelerator) can thereby be thoroughly mixed as efficiently and rapidly as possible and can subsequently be conveyed out of the mixer without the mixer blocking in the process and failing in its function.

It has been shown in tests that higher rotational speeds result in the following effects: firstly, the concrete or mortar and the hardening accelerator are more thoroughly mixed, which results in a more controllable hardening behavior. Secondly, the concrete or mortar is broken open to a greater extent, and therefore the hardening accelerator can act on a greater surface area of the concrete or mortar, which results in a more rapid and better controllable reaction between concrete or mortar and accelerator. Thirdly, more energy is admitted into the mixture, which results in greater heating of concrete or mortar and accelerator, which in turn, accelerates the hardening process.

The above-described effects have been observed to an increasing extent up to a rotational speed of 2000 revolutions per minute.

In an exemplary embodiment, during the mixing in the first mixer, an average residence time of the ingredients or components of the building material in the mixer is less than 40 s, particularly preferably less than 30 s, particularly preferably less than 20 s.

In an exemplary embodiment, during the mixing in the second mixer, an average residence time of ingredients or components of the building material in the mixer is less than 20 s, particularly preferably less than 15 s, particularly preferably less than 10 s.

The average residence time of the mixture in the drum is the period of time spent on average by a particle in the drum (from the inlet of the drum to the outlet of the drum).

An abovementioned advantageous average residence time of at most just a few seconds has the advantage that a mixing material of high or greatly increasing viscosity can thereby be conveyed, such as, for example, pumpable concrete or mortar or concrete or mortar with added hardening accelerator.

In an exemplary embodiment, during the providing of the first ingredient of the first component of the building material, the first ingredient is metered gravimetrically.

The gravimetric metering of the first ingredient of the first component of the building material, in particular a dry mixture of cement and aggregate, has the advantage that a building material which has constant properties can thereby be obtained.

In an exemplary embodiment, during the providing of the second ingredient of the first component of the building material, the second ingredient is metered volumetrically.

The volumetric metering of the second ingredient, in particular of water with or without additives, has the advantage that a cost-effective system for supplying the second ingredient of the first component can thereby be provided.

In contrast to the dry mixture of the first ingredient, the liquid second ingredient can be supplied in a sufficiently accurately metered manner by volumetric metering.

In an exemplary embodiment, the building material is applied in at least partially overlapping layers such that the structure is constructed in the manner of a 3D printer.

The advantage of building material applied in layers consists in that entire structures can thereby be constructed in an automated and efficient manner from building material.

In an exemplary development, during the application, an existing layer is only overlapped by a new layer of the building material if the existing layer has a sufficiently high strength to retain an original shape under the weight of the new layer.

The application of the building material in the manner of a 3D printer means that in particular formwork is no longer necessary for the building material. In addition, shaping of the structure to be produced from building material can be selected substantially more freely.

Details and advantages of the invention will be described below using exemplary embodiments and with reference to schematic drawings, in which.

Figure 1:
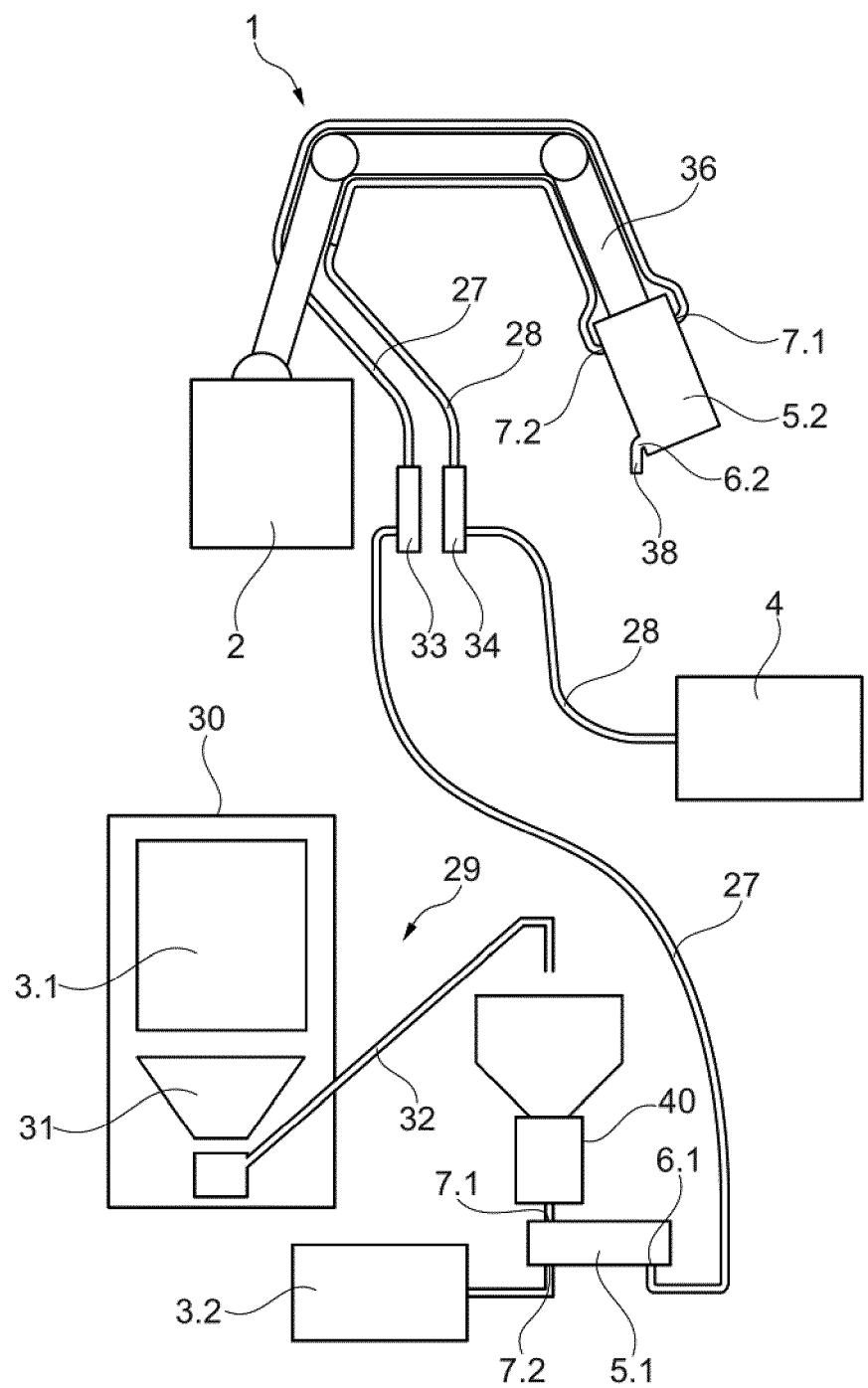
FIG. 1 shows a schematic illustration of an exemplary system for applying a building material.

FIG. 1 schematically illustrates an exemplary system 1 for applying a building material. The system 1 comprises a movement device 2 for changing a site of application in a space. In this exemplary embodiment, the movement device 2 is designed as a crane-like device with a movable arm. The movable arm has a head 36 at a distal end.

In a storage device 30, a first ingredient 3.1 of a first component 3 of the building material is supplied via a hopper 31 and via a conveyor 32 to a metering device 40. The metering device 40 and the storage device 30 together form a supply device 29 which can supply the first ingredient 3.1 of the first component to a first mixer 5.1. The first ingredient 3.1 is supplied via a first inlet 7.1 of the first mixer 5.1.

A second ingredient 3.2 of the first component 3 is supplied to the first mixer 5.1 via a second inlet 7.2 of the first mixer 5.1.

In the first mixer 5.1, the first ingredient 3.1 and the second ingredient 3.2 are mixed in order to form the first component 3 of the building material. Via an outlet 6.1 of the first mixer 5.1, the first component 3 is supplied to the second mixer 5.2 via a first tube system 27. A first pump 33 can convey the first component 3 through the first tube system 27.

Furthermore, the system 1 comprises a second component 4 which can be supplied to the second mixer 5.2 via a second tube system 28. A second pump 34 can also be provided here in order to convey the second component 4 through the second tube system 28.

The first component 3 and the second component 4 are mixed together in the second mixer 5.2. The first component 3 is supplied via a first inlet 7.1 to the second mixer 5.2, and the second component 4 is supplied via a second inlet 7.2 to the second mixer 5.2. The building material produced in the second mixer 5.2 leaves the second mixer 5.2 via an outlet 6.2 of the second mixer 5.2 and is then applied via an outlet opening 38.

In this exemplary embodiment, the first mixer 5.1 is arranged in a stationary manner, and the second mixer 5.2 is arranged movably on the movement device 2. The second mixer 5.2 is arranged on the head 36 of the movement device 2 such that the second mixer 5.2 is in each case in a region of the site of application.

Figure 2:
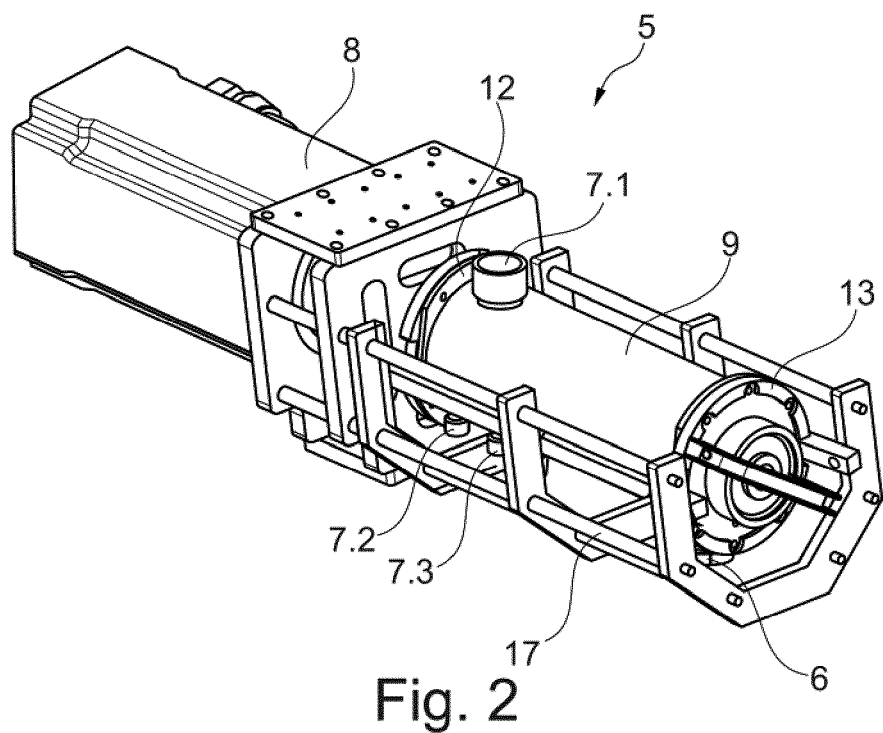
FIG. 2 shows a schematic illustration of an exemplary mixer.

FIG. 2 schematically illustrates an exemplary mixer 5. The mixer 5 comprises a drive 8, a drum 9, a proximal closure 12, a distal closure 13, an outlet 6, a first inlet 7.1, a second inlet 7.2, a third inlet 7.3 and a supporting means 17. For example, during use of the mixer 5 as the second mixer 5.2, the first component 3 can be supplied via the first inlet 7.1, and the second component 4 via the third inlet 7.3, wherein the second inlet 7.2 can be used for cleaning the drum 9 with a cleaning liquid.

As an alternative, the mixer 5 illustrated here, during use as the first mixer 5.1, can be used for mixing the first ingredient 3.1 and the second ingredient 3.2 in order to form the first component 3. Then, for example, the first ingredient 3.1 can be supplied via the first inlet 7.1, and the second ingredient 3.2 can be supplied via the third inlet 7.3, wherein the second inlet 7.2 can be used for cleaning the drum 9 with a cleaning liquid.

In this exemplary embodiment, the distal closure 13 is connected to the drive 8 via the supporting means 17, and therefore a stirring shaft (not visible in this figure) can be mounted both in the proximal closure 12 and in the distal closure 13.

Figure 3:
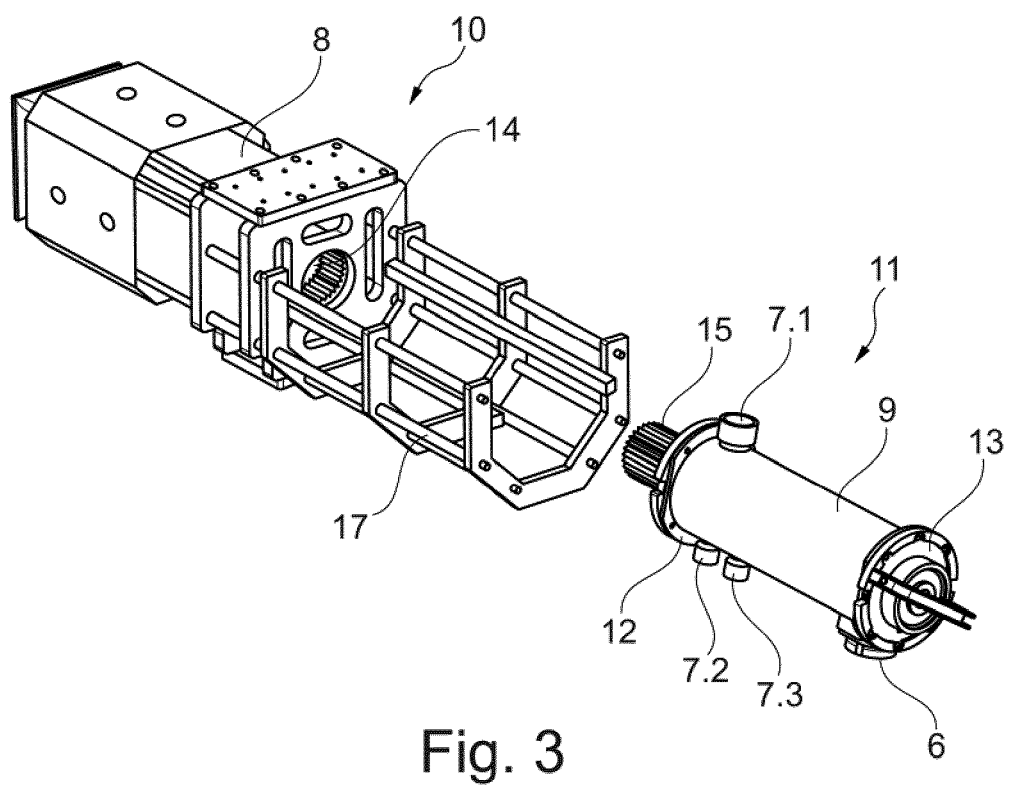
FIG. 3 shows a schematic illustration of an exemplary drive module and mixing chamber module of a mixer.

FIG. 3 illustrates the same mixer 5 as previously in FIG. 2, but in this figure the drive module 10 and the mixing chamber module 11 are separated from each other. It is apparent here that the drive module 10 comprises a first coupling element 14, and the mixing chamber module 11 comprises a second coupling element 15. In this exemplary embodiment, the coupling elements 14, 15 each have a toothing which intermesh in an application state.

The separable arrangement of mixing chamber module 11 and drive module 10 enables in particular the mixing chamber module 11 to be removed from the system 1 in order to carry out cleaning and/or maintenance work on the mixing chamber module 11. In particular, the drum 9 can thereby be cleaned in a simple manner without the entire mixer 5 having to be removed from the system 1.

Figure 4:
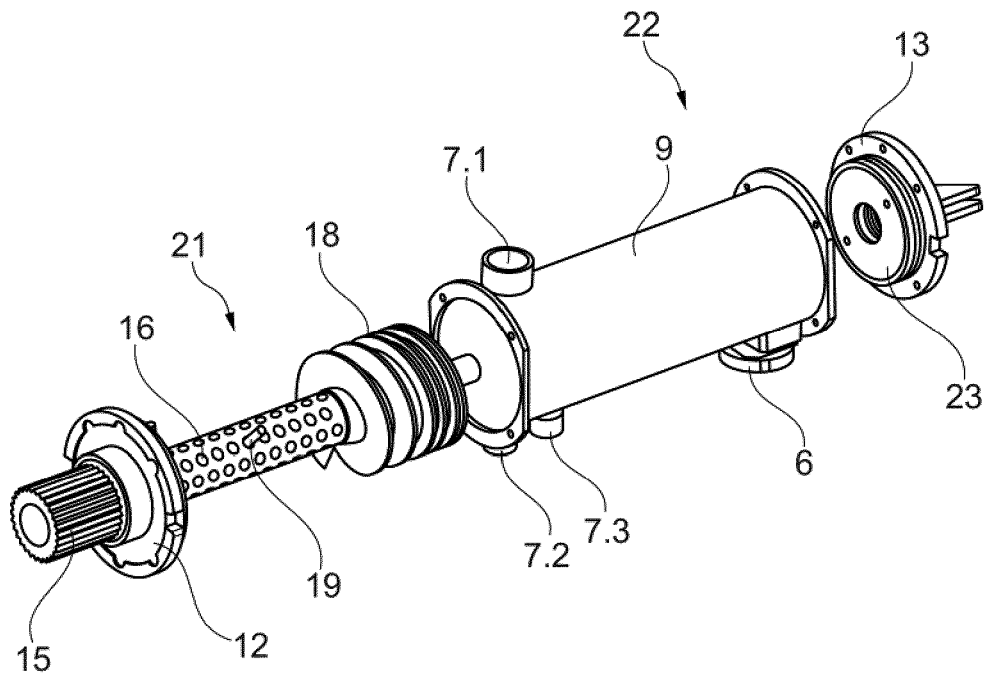
FIG. 4 shows a schematic illustration of an exemplary shaft module and drum module of a mixing chamber module.

FIG. 4 illustrates the mixing chamber module 11 without the drive module 10. FIG. 4 depicts the mixing chamber module 11 in a separated state. In this exemplary embodiment, the mixing chamber module 11 comprises a shaft module 21 and a drum module 22.

The shaft module 21 in this exemplary embodiment comprises the second coupling element 15, the proximal closure 12, the stirring shaft 16 and a conveyor element 18.

The drum module 22 in this exemplary embodiment comprises an integrally formed tubular drum 9 and a distal closure 13. The drum 9 has a first inlet 7.1, a second inlet 7.2 and a third inlet 7.3 which are all arranged in a first end region of the drum 9. The outlet 6 is arranged on a second end region of the drum 9.

The distal closure 13 in this exemplary embodiment has a sacrificial plate 23 which is arranged on a side of the distal closure 13 that faces the drum 9. The sacrificial plate 23 becomes worn during operation of the system and can be replaced as required. As a result, the distal closure 13 can be used for a longer period of time.

The conveyor element 18 in this exemplary embodiment is designed as a screw conveyor. The conveyor element 18 is arranged attached to the stirring shaft 16. In addition, the conveyor element 18 is secured on the stirring shaft 16 with a locking element (not apparent in this figure).

Figure 5:
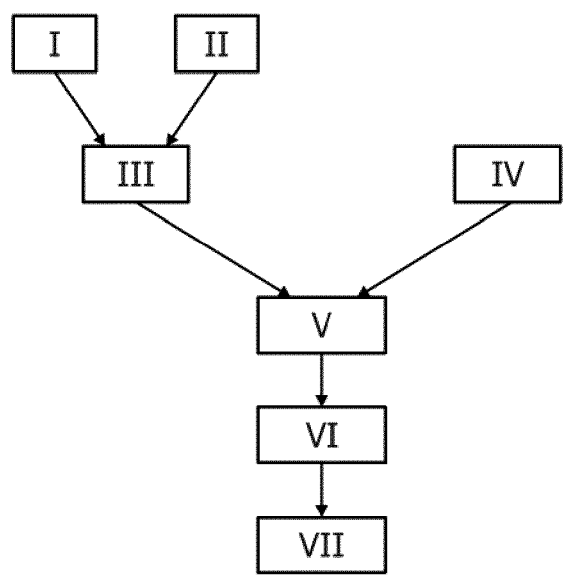
FIG. 5 shows a schematic illustration of an exemplary method for producing a structure from a building material.

FIG. 5 finally schematically illustrates a method for producing a structure from a building material. The various method steps are broken down as follows:

I providing the first ingredient of the first component of the building material
II providing the second ingredient of the first component of the building material
III mixing the first ingredient and the second ingredient to form the first component of the building material
IV providing the second component of the building material
V mixing the first component and the second component to form the building material
VI moving the movement device in order to change a site of application in a space
VII applying the building material.

It goes without saying that the method steps mentioned here can proceed simultaneously, and therefore the building material can be applied continuously in order to produce a structure from the building material.

LIST OF REFERENCE SIGNS

1 System
2 Movement device
3 First component
3.1 First ingredient
3.2 Second ingredient
4 Second component
5 Mixer
5.1 First mixer
5.2 Second mixer
6 Outlet
6.1 Outlet of the first mixer
6.2 Outlet of the second mixer
7 Inlet
7.1 First inlet
7.2 Second inlet
7.3 Third inlet
8 Drive
9 Drum
10 Drive module
11 Mixing chamber module
12 Proximal closure
13 Distal closure
14 First coupling element
15 Second coupling element
16 Stirring shaft
17 Supporting means
18 Conveyor element
19 Stirring element
21 Shaft module
22 Drum module
23 Sacrificial plate
27 First tube system
28 Second tube system
29 Supply device
30 Storage device
31 Hopper
32 Conveyor
33 First pump
34 Second pump
36 Head of the movement device
38 Outlet opening
40 Metering device
I Providing the first ingredient
II Providing the second ingredient
III Mixing the first ingredient and the second ingredient IV Providing the second component
V Mixing the first component and the second component
VI Moving the movement device
VII Applying the building material

The invention claimed is:

1. A system for applying a building material, the system comprising:
a first component of the building material, the first component comprising a first ingredient comprising cement and an aggregate and a second ingredient comprising water;
a second component of the building material comprising a hardening accelerator;
a first mixer configured to mix the first ingredient and the second ingredient of the first component;
a supply device configured to supply the first ingredient of the first component to the first mixer; and
a movement device having at least a movable portion, a stationary portion, and a second mixer that is arranged on the movable portion, the movement device configured to change a site of application in a space,
wherein (i) the second mixer is configured to mix the first component and the second component, and (ii) the movement device is configured to move the second mixer relative to at least the stationary portion of the moving device to apply the building material, and to construct a structure from the building material at the site of application.

2. The system as claimed in claim 1, wherein at least one of the first mixer and the second mixer is constructed modularly and comprises a drive module with a first coupler, and a mixing chamber module with a second coupling coupler, wherein the modules are operatively connected to each other in a use state via the first coupler and the second coupler.

3. The system as claimed in claim 1, wherein the first mixer is arranged in a stationary manner.

4. The system as claimed in claim 1, wherein at least one of the first mixer and the second mixer comprises a stirring shaft which is equipped with at least one pin disposed on a first portion of the stirring shaft and on which a conveyor is arranged on a second portion of the stirring shaft.

5. The system as claimed in claim 1, wherein the supply device comprises a storage device and a metering device.

6. The system as claimed in claim 5, wherein at least one of (i) the metering device is designed as a gravimetric metering device, and (ii) the storage device comprises a hopper and a conveyer.

7. The system as claimed in claim 1, wherein the system comprises at least one of a first pump and a second pump, and
at least one of (i) the first component is configured to be pumped from the first mixer to the second mixer by the first pump, and (ii) the second component is configured to be pumped to the second mixer by the second pump.

8. A method for producing a structure from a building material, the method comprising:
providing a first ingredient of a first component of the building material, the first ingredient comprising cement and an aggregate;
providing a second ingredient of the first component of the building material, the second ingredient comprising water;
mixing the first ingredient and the second ingredient of the first component in a first mixer;
providing a second component of the building material comprising a hardening accelerator;
mixing the first component and the second component in a second mixer;
moving a movement device for changing a site of application in a space, the movement device having at least a movable portion, a stationary portion, and the second mixer, which is arranged on the movable portion; and
applying the building material,
wherein the movement device is configured to move the second mixer relative to at least the stationary portion of the moving device to apply the building material, and to construct a structure from the building material at the site of application.

9. The method as claimed in claim 8, wherein at least one of the first mixer and the second mixer is operated at a rotational speed of more than 500 revolutions per minute.

10. The method as claimed in claim 8, wherein at least one of (i) during the mixing in the first mixer, an average residence time of the ingredients in the mixer is less than 40 s, and (ii) during the mixing in the second mixer, an average residence time of the components of the building material in the mixer is less than 20 s.

11. The method as claimed in claim 8, wherein at least one of (i) during the providing of the first ingredient of the first component of the building material, the first ingredient is metered gravimetrically, and (ii) during the providing of the second ingredient of the first component of the building material, the second ingredient is metered volumetrically.

12. The method as claimed in claim 8, wherein the building material is applied in at least partially overlapping layers such that a structure is constructed in the manner of a 3D printer.

* * * * *